United States Patent [19]
Hannya et al.

[11] Patent Number: 5,150,542
[45] Date of Patent: * Sep. 29, 1992

[54] GLASS RUNNER STRUCTURE OF VEHICULAR DOOR

[75] Inventors: Shuichi Hannya, Chigasaki; Nozomi Iida, Hadano, both of Japan

[73] Assignee: Nissan Motor Co., Ltd., Japan

[*] Notice: The portion of the term of this patent subsequent to Aug. 27, 2008 has been disclaimed.

[21] Appl. No.: 297,739

[22] Filed: Jan. 17, 1989

[30] Foreign Application Priority Data

Jan. 22, 1988 [JP] Japan .................................. 63-11984

[51] Int. Cl.⁵ ............................................... E06B 7/16
[52] U.S. Cl. ......................................... 49/441; 49/488
[58] Field of Search ................ 49/374, 376, 440, 502, 49/490, 491, 488, 485, 496

[56] References Cited

U.S. PATENT DOCUMENTS

| | | | |
|---|---|---|---|
| 2,647,792 | 8/1953 | Flemming | 49/485 |
| 3,600,858 | 11/1969 | Savell | 49/488 |
| 4,756,944 | 7/1988 | Kisanuki | 49/490 |

FOREIGN PATENT DOCUMENTS 62-56419 4/1987 Japan .

Primary Examiner—Gerald A. Anderson
Attorney, Agent, or Firm—Lowe, Price, LeBlanc & Becker

[57] ABSTRACT

Disclosed herein is an improved glass runner structure which is installed in a window frame of a door for guiding an upward and downward movement of a window panel. The glass runner structure comprises a main seal portion against which an upper edge of the window panel sealingly abuts when the panel assumes its fully closed position; a base portion integral with the main seal portion, the base portion being secured to the window frame; a seal lip integral with the base portion, the seal lip sealingly contacting to an inner surface of the window panel when the window panel assumes the fully closed position; and a structure for directing an upward movement of the window panel toward the main seal portion when the seal lip is flexed to a certain degree by the window panel.

11 Claims, 2 Drawing Sheets

GLASS RUNNER STRUCTURE OF VEHICULAR DOOR

BACKGROUND OF THE INVENTION

1. Field of the Invention

The present invention relates in general to a vehicular door having in a window frame a glass runner structure through which a window panel runs upward and downward, and more specifically, to a glass runner structure which is suited for a flash-surface body construction of the vehicle.

2. Description of the Prior Art

In recent years, a so-called flash-surface body construction has been widely applied to motor vehicles, particularly to passenger motor vehicles, for the excellency in design and reduced air resistance which the same has during running of the vehicle. One of doors employed in such motor vehicles is disclosed in Japanese Utility Model First Provisional Publication No. 62-56419, which has a glass runner structure suited for the flash-surface body construction of the vehicle.

The door disclosed in the publication is shown in FIGS. 4 and 5 of the accompanying drawings, which has the conventional glass runner structure mounted thereon. The structure comprises a glass runner 11 constructed of a molded rubber and a window frame 12A constructed of a part of a door panel 12. As is shown in FIG. 5, the window frame 12A is formed with a flange 12a to which the glass runner 11 is fixed. The glass runner 11 comprises a main seal portion 11a which guides the upward and downward movement of a window panel 13 and a seal lip portion 11b which sealingly contacts to an inner surface of the window panel 13 to prevent water penetration into the vehicle cabin. A retainer clip 14 of metal is employed for tightly connecting the glass runner 11 to the window frame 12A. With this retainer clip 14, undesired outside dislocation of the window panel 13 during high speed cruising of the vehicle is suppressed. In fact, during cruising of the vehicle, a lower pressure area is produced about the outer surface of the moving vehicle, which tends to bias the window panel 13 outwardly. The retainer clip 14 is of a channel structure, which comprises a L-shaped base portion 14a secured to the window frame 12A and a leading end portion 14b located outside of the vehicle body as shown.

However, the above-mentioned glass runner structure has the following drawbacks.

That is, since the positioning accuracy of the glass runner 11 and the retainer clip 14 relative to the window panel 13 depends directly on not only the accuracy with which the window frame 12A is constructed with respect to the door panel 12 but also the accuracy with which the window panel 13 is assembled with respect to the door panel 12, it sometimes occurs that, as is shown by the broken line and the phantom line in FIG. 5, the window panel 13 fails to assume its right position relative to the glass runner 11. In fact, it is difficult or at least troublesome to accurately construct the window frame 12A and accurately assemble the window panel 13 because of considerable sizes and weights which they have. Thus, in the conventional glass runner structure, it tends to occur that the window panel 13 fails to assume its full closed position due to its deep contact against the seal lip portion 11b of the glass runner 11 and the window panel 13 fails to have its inner surface properly sealed by the seal lip portion 11b due to its outward dislocation.

SUMMARY OF THE INVENTION

Therefore, it is an object of the present invention to provide a glass runner structure which is free of the above-mentioned drawbacks.

According to the present invention, there is provided an improved glass runner structure which is installed in a window frame of a door for guiding an upward and downward movement of a window panel. The glass runner structure comprises a main seal portion against which an upper edge of the window panel sealingly abuts when the panel assumes its fully closed position; a base portion integral with the main seal portion, the base portion being secured to the window frame; a seal lip integral with the base portion, the seal lip sealingly contacting to an inner surface of the window panel when the window panel assumes the fully closed position; and means for directing an upward movement of the window panel toward the main seal portion when the seal lip is flexed to a certain degree by the window panel.

BRIEF DESCRIPTION OF THE DRAWINGS

Other objects of the invention will become apparent from the following description when taken in conjunction with the accompanying drawings, in which.

DETAILED DESCRIPTION OF THE INVENTION

Figure 1:
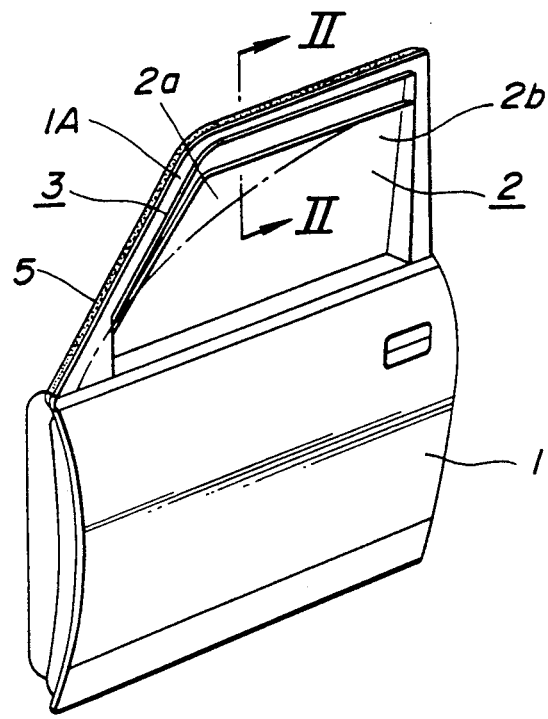
FIG. 1 is a perspective view of a vehicular door to which a glass runner structure of the present invention is practically applied.
Figure 2:
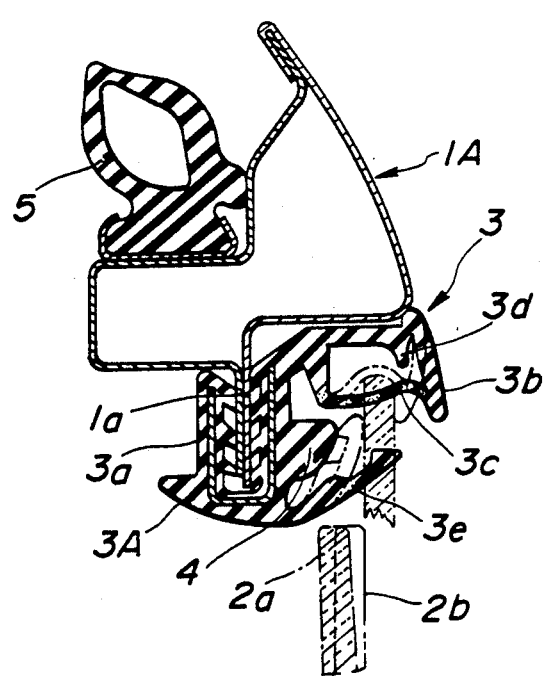
FIG. 2 is an enlarged sectional view taken along the line II—II FIG. 1, showing a first embodiment of the invention.

Referring to FIGS. 1 and 2, there is shown a first embodiment of the present invention, which is a glass runner structure installed in a window frame of a vehicular door.

FIG. 1 shows the vehicular door which comprises a door panel 1 having a window frame 1A integrally mounted thereon. A glass runner 3 of rubber material extends along an inner peripheral surface of the window frame 1A and is secured to the same. The glass runner 3 has a longitudinally extending groove in and along which a peripheral portion of a window panel 2 slides during upward and downward movement of the window panel 2.

FIG. 2 is a sectional view, but on an enlarged scale, taken along the line II—II of FIG. 1, showing an upper part of the window frame 1A and an upper portion 3A of the glass runner 3. The window frame 1A has a flange 1a integrally mounted on the inner peripheral surface thereof. The glass runner 3 is constructed of a molded rubber material or the like, which comprises an elongate base portion 3a which is fixed to the flange 1a of the window frame 1A, an elongate hollow main seal portion 3b against which an upper edge of the window panel 2 sealingly abuts when the window panel 2 assumes its uppermost or fully closed position. In order to assure the connection between the base portion 3a and the flange 1a, a metal core (no numeral) is embedded in the base portion 3a. Furthermore, as shown, the hollow main seal portion 3b contacts at its upper base part to an outboard part of the inner peripheral wall of the window frame 1A and has a longitudinally extending hardened ridge 3d projected into the hollow thereof. Designated by numeral 3c is an elongate flexible lobe-like wall 3c of the hollow main seal portion 3b.

The glass runner 3 further comprises an elongate seal lip 3e which extends outwardly and slightly upwardly from a lower part of the base portion 3a. As shown in FIG. 2, when the window panel 2 assumes the closed position, the seal lip 3e contacts the inner surface of the panel 2 to prevent water penetration into the vehicle cabin. The base portion 3a of the glass runner 3 is further provided with an integral stopper ridge 4 which is exposed to a space defined between the seal lip 3e and the flexible lobe-like wall 3c. With provision of this stopper ridge 4 to which the seal lip 3e can abut, excessive flexure of the seal lip 3e is suppressed. The ridge 4 has a smoothly rounded lower part to which the seal lip 3e intimately contacts when the same is flexed by the raised window panel 2. In the illustrated example, a corner part 2a of the window panel 2 is slightly inclined toward an inboard side of the door 1, so that upon full closing of the window panel 2, the corner part 2a strongly presses the seal lip 3e against the stopper ridge 4. Denoted by numeral 2b is a major part of the window panel 2.

The window frame 1A has further a conventional weather strip 5 mounted thereon, which makes a seal about the periphery of the window frame 1A when the door 1 is closed with respect to the vehicle body.

Figure 4:
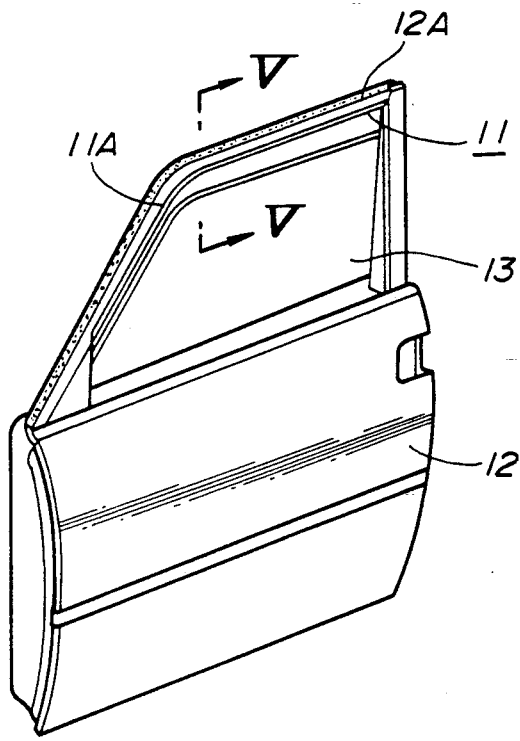
FIG. 4 is a perspective view of a vehicular door to which a conventional glass runner structure is applied.
Figure 5:
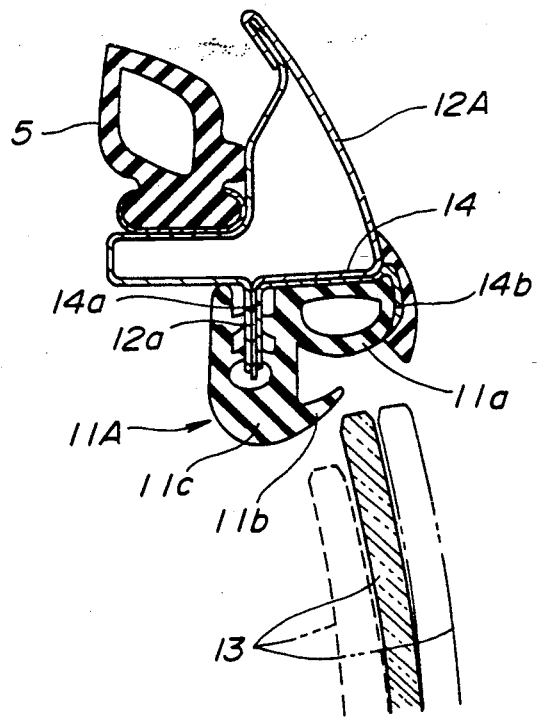
FIG. 5 is an enlarged sectional view taken along the line V—V of FIG. 4.

The glass runner structure of the first embodiment is free of the above-mentioned drawbacks possessed by the conventional glass runner structure of FIGS. 4 and 5, for the reasons which will be described in the following.

That is, during upward movement of the window panel 2, the corner portion 2a, which is somewhat inclined, presses the seal lip 3e against the stopper ridge 4 of the glass runner 3 and thus the same is led toward the main seal portion 3b. Thus, the fully closing of the window panel 2 is always achieved properly even if the upward movement of the panel 2 is carried out with a dislocation thereof relative to the glass runner structure.

This advantageous matter will be readily understood from the following description with reference to FIG. 2.

When the window panel 2 is raised up to a certain position, the corner portion 2a of the window panel 2 is brought into contact with the seal lip 3e and flexes the same. Further upward movement of the window panel 2 causes the seal lip 3e to abut against the rounded lower surface of the stopper ridge 4, and thus thereafter, further flexure of the seal lip 3e is suppressed causing the upward movement of the window panel 2 to be directed outwardly, that is, toward the main seal portion 3b. Finally, the upper edge of the window panel 2 abuts against the flexible lobe-like wall 3c of the main seal portion 3b and flexes the same as shown by a phantom line in FIG. 2. Under this condition, the window panel 2 is fully sealed by the glass runner 3.

When, during cruising of the vehicle, the sealed window panel 2 is biased outward due to creation of the lower pressure area about the outer surface of the vehicle, the upper edge of the window panel 2 is brought into abutment with the hardened ridge 3d through the lobe-like wall 3c. Thus, the undesired outward dislocation of the window panel 2 is prevented.

Because of provision of the stopper ridge 4 by which the upward movement of the window panel 2 is positively directed outward, the allowable error in constructing and assembling the glass runner structure of the door increases thereby facilitating production of the door.

Figure 3:
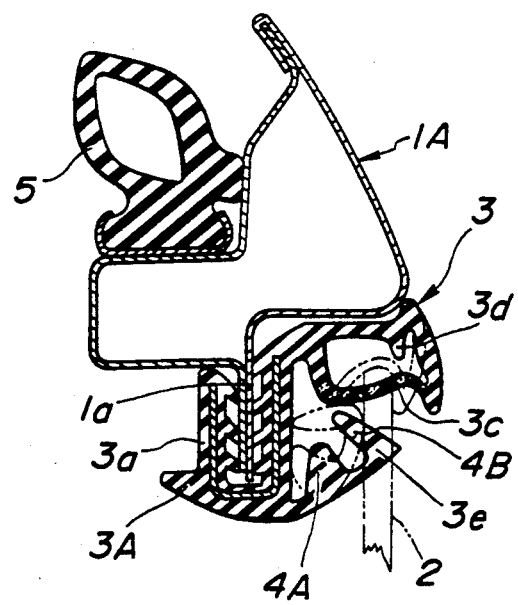
FIG. 3 is a view similar to FIG. 2, but showing a second embodiment of the present invention.

Referring to FIG. 3, there is shown a second embodiment of the present invention. In the drawing, the parts substantially the same as those in FIG. 2 are denoted by the same numerals and detailed explanation of them will be omitted from the following description.

In the second embodiment, the seal lip 3e is formed at its inside surface with two parallel ridges 4A and 4B which serve as the stopper ridge (4) of the above-mentioned first embodiment. That is, when the seal lip 3e is flexed to a certain degree by the window panel 2, tops of the two ridges 4A and 4B are brought into abutment with the base portion 3a of the glass runner 3 thereby directing the upward movement of the window panel 2 toward the main seal portion 3b, that is, toward the right position.

We claim:

1. In a glass runner structure installed in a window frame of a door for guiding upward and downward movement of a window panel, an elongate base portion secured to and extending along said window frame;

an elongate main seal portion integral with said elongate base portion, said elongate main seal portion being so arranged that when said window panel assumes a fully closed position, an upper edge of said window panel abuts sealingly against said elongate main seal portion;

an elongate seal lip integral with said elongate base portion, said elongate seal lip contacting sealingly to an inner surface of said window panel when said window panel assumes said fully closed position; and means for directing the upward movement of said window panel toward a desired portion of said elongate main seal portion when, upon contact of said seal lip with said inner surface of said window panel, said elongate seal lip is flexed by said window panel to such a degree as to contact with said elongate base portion.

2. A glass runner structure as claimed in claim 1, in which said means comprises a projection which is integrally formed on either one of said base portion and said seal lip.

3. A glass runner structure as claimed in claim 2, in which said projection is a ridge which extends longitudinally along the glass runner structure.

4. A glass runner structure as claimed in claim 3, in which said ridge is formed on said base portion in a manner to project into a space which is defined between said main seal portion and said seal lip.

5. A glass runner structure as claimed in claim 4, in which said ridge is formed with a rounded lower part against which an inner surface of said seal lip contacts when the seal lip is flexed to a certain degree by said window panel.

6. A glass runner structure as claimed in claim 3, in which said ridge is formed on an inboard surface of said seal lip, said ridge being brought into contact with said base portion when said seal lip is flexed to a certain degree by said window panel.

7. A glass runner structure as claimed in claim 6, in which said ridge comprises two elongate parts which extend in parallel along said elongate seal lip.

8. A glass runner structure as claimed in claim 3, further comprising a stopper means which suppresses an outward dislocation of said upper edge of said window panel when said window panel assumes the fully closed position.

9. A glass runner structure as claimed in claim 8, in which said stopper means comprises a ridge which extends along said elongate main seal portion and projects toward said window panel.

10. A glass runner structure as claimed in claim 9, in which said elongate main seal portion comprises:
 a grooved portion having an upper base portion contacting to an inner peripheral wall of said window frame; and
 a flexible lobe-like wall which is integral with said grooved portion and covers the groove of said grooved portion thereby to allow said elongate main seal portion to have a hollow structure.

11. A glass runner structure as claimed in claim 10, in which said stopper ridge is projected into the hollow of said main seal portion.

* * * * *